United States Patent Office 2,947,713
Patented Aug. 2, 1960

2,947,713

PROTECTIVE COATING COMPOSITIONS COMPRISING PYROGENIC SILICA

Merrill E. Jordan, Walpole, and William G. Burbine, Whitman, Mass., assignors to Godfrey L. Cabot, Inc., Boston, Mass., a corporation of Massachusetts No Drawing. Filed Oct. 7, 1954, Ser. No. 461,032

3 Claims. (Cl. 260—19)

This invention relates to protective coating compositions and more particularly to a transparent pigmented gloss varnish composition having exceptional hold out and gloss characteristics.

Varnish may be defined broadly as the liquid constituent of any protective coating material. Usually, however, it is used in the protective coating art to designate solutions of resinous materials in oil and/or solvents and it is with varnishes of this character that our invention is concerned. The ASTM definition of varnish, taken from "Paint and Varnish Technology" by von Fischer is, "a liquid composition which is converted to a transparent or translucent solid film after application as a thin layer."

Varnish is widely used as a protective coating where it is desired to preserve the natural color of the object to which it is applied. Being normally almost colorless varnish serves to protect and glaze the surface on which it is deposited without substantially altering the color of that surface. However, when it is applied to porous surfaces, notably wood, the varnish tends to become absorbed thereby so that at least two and usually more coats must be applied to achieve the desirable glossy effect. The principal disadvantages of applying multiple coats are, of course, the expense involved and the darkening of the surface which increases with each successive coat.

In order to limit the penetration of varnish into a porous surface, substantially colorless, i.e., white, pigments may be included in the varnish composition. While these pigments have generally effected some improvement in hold out (resistance to penetration) they have also universally had undesirable side effects, notably in "flatting" the varnish. Thus, to preserve the glossy characteristics of varnishes very little of these heretofore known pigment additives can be tolerated—far too little for good hold out.

Accordingly, our discovery that a particular finely divided silica pigment as hereinafter described when mixed with varnish up to a certain critical proportion greatly increased the hold out of the varnish without impairing its gloss characteristics was completely unexpected and most surprising. Whereas other silica and silicate pigments, even in very low concentrations, destroyed the gloss effect of the varnish the composition of our invention was of high gloss. Furthermore, although it was impossible to add sufficient of other known substantially noncoloring pigments to varnish to achieve any noticeable increase in hold out properties without at the same time eliminating gloss the same was not true with the novel composition of our invention.

It is the principal object of this invention to provide a novel varnish composition having exceptional hold out and gloss characteristics.

It is a further object of this invention to provide a novel composition composed essentially of varnish and pyrogenic silica in proportions such that hold out and gloss characteristics of the composition are superior to any heretofore known product of comparable nature.

The novel composition of this invention consists of varnish and a finely-divided silica as hereinafter defined in properties such as to provide a pigment volume concentration (PVC) of about 1.67 to 7.00. In this range the composition has superior hold out qualities and is by standards current in the protective coatings industry, a glossy material when dry.

The silica constituent of this novel composition is a very finely-divided silica having an average particle size of below about 50 millimicrons produced by the oxidation or hydrolysis of a silicon tetrahalide at elevated temperatures advantageously in a flame. One suitable process for the production of such silica is that described in copending U.S. application, Serial No. 129,089 of Stokes and Kistiakowsky and another is that of U.S. Patent No. 2,535,036, Broughton in both of which processes reaction occurs in a flame, hence the silica product is commonly referred to as "pyrogenic silica." This material is characterized by high surface area and surface activity and, as previously stated, very small particle size. By reason of the combination of this particular silica with varnish in the proportions mentioned a composition never before attainable has been produced.

It is standard practice in the protective coating industry to define a filled or pigmented coating in terms of its pigment volume concentration. The PVC of such material is the ratio of pigment volume to the total volume of the composition exclusive of solvents, or, stated as a formula, $$PVC = \frac{\text{vol. of pigment}}{\text{vol. pigment} + \text{vol. binder}}$$

the binder in the case of varnish being the oil-resin mixture. While it would be equally possible to define a composition in terms of ratio of pigment to oil only, the above formula is preferred as it provides for variations in oil to resin ratio which constitutes an important variable in characterizing the final coating compound.

Although the compositions of this invention include any and all varnishes, those of particular interest are the China-wood oil-phenol-formaldehyde or alkyd resin varnishes. Such varnishes will usually contain about 8–40 gals. of China-wood (tung) oil per 100 lbs. resin. A typical varnish is made by heating the selected quantity of oil very rapidly to about 575° F. to body it. The resin is then added to the oil and when cooled to about 400° F. mineral spirits are stirred in an amount to give the finished varnish a viscosity of 1–2 poises and a nonvolatile content of about 50–60%. Antiskinning agents, such as guiacol or butyraldoxime and driers such as lead or cobalt, each to the extent of a few tenths of a percent on the weight of the oil, are usually included as well. Other oils and other solvents well known to those skilled in the art may be substituted in whole or in part for those above-mentioned.

To prepare the composition of this invention the varnish is mixed with additional solvent such as mineral spirits or xylene and is then milled with the selected amount of silica in a ball mill for about 2 hours. If necessary to achieve good dispersion the silica may be added incrementally to the varnish in the mill. After sufficient milling the composition is ready for use.

The following examples are illustrative of the composition of our invention.

*Example 1*

95 parts by weight of a 30 gal. China-wood oil-phenolic varnish was milled with 10 parts mineral spirits and 5 parts silica for a PVC of 4.22. This composition had 60° gloss value as determined by the Photovolt reflection meter of approximately 98%.

Example 2

75.6 parts by weight of a 13 gal. China-wood oil-phenolic varnish was milled with 19.0 parts xylene and 5.4 parts silica for a PVC of 6.22. This 60° gloss value of this composition was approximately 93%.

Example 3

83.6 parts by weight of a 30 gal. China-wood oil-phenolic varnish was milled with 9.1 parts mineral spirits and 7.3 parts silica for a PVC of 6.77. This composition had a 60° gloss value as determined by the Photovolt reflection meter of approximately 92%.

Example 4

96 parts by weight of a 30 gal. China-wood oil-phenolic varnish was milled with 4 parts by weight of silica for a PVC of 3.36. This composition had a 60° gloss as determined by the Photovolt reflection meter of approximately 100%.

Samples of each of these varnish compositions were tested for hold out by drawing down a film of the material with a .003 inch drawdown blade on plywood panels. 60° measurements were made on these panels as for the glass panel tests and showed results similar to those set forth in the examples. Furthermore, the gloss readings over the entire surface of the panels were substantially identical confirming visual observation of uniform and good hold out of the composition.

The Photovolt photoelectric reflection meter with which the gloss tests were made is a product of the Photovolt Corporation, New York, N.Y., and is a standard instrument used extensively in the industry. It measures diffuse reflection of surfaces by means of a photocell and gives readings which can be correlated directly with a standard of maximum gloss value. The angle of light diffusion for paint and varnish tests is 60° which is likewise standard for the industry. Its operation is discussed in "Color in Business, Science and Industry" by D. B. Judd, 1952, John Wiley & Sons, Inc.

The percentage gloss values set forth in the examples represent percent of the standard of maximum gloss and are taken from glass plates on which a film of varnish is spread and dried.

Having thus described our invention, we claim:

1. A novel substantially transparent, protective film forming, coating composition characterized by exceptionally high gloss and hold-out properties which comprises varnish and as the sole pigment contained in said composition pyrogenic colloidal silica, said varnish being a mixture of tung-oil type oil and organic resin in a ratio of from about 8-40 gallons of said oil per 100 pounds of said resin and said silica being the product of flame hydrolysis of a silicon tetrahalide at elevated temperatures, having an average discrete particle size of below about 50 millimicrons, and being present in pigment volume concentration of from about 1.67-7, the finished film from said composition having a 60° gloss value as determined by the Photovolt reflection meter of at least 90%.

2. The composition according to claim 1 wherein the oil constituent of the varnish is China-wood oil and the organic resin constituent of the varnish is phenol formaldehyde resin.

3. The composition according to claim 1 wherein the oil constituent of the varnish is China-wood oil and the organic resin constituent of the varnish is alkyd resin.

References Cited in the file of this patent

UNITED STATES PATENTS

| | | |
|---|---|---|
| 2,535,036 | Broughton | Dec. 26, 1950 |
| 2,561,304 | Hazel | July 17, 1951 |
| 2,717,214 | Marotta et al. | Sept. 6, 1955 |
| 2,798,792 | Stelling et al. | July 9, 1957 |
| 2,806,109 | Sterling | Sept. 10, 1957 |
| 2,819,151 | Flemmert | Jan. 7, 1958 |

OTHER REFERENCES

Ellis: The Chemistry of Synthetic Resins, pp. 934–944, Reinhold (1935).

The Condensed Chemical Dictionary, page 1147, Reinhold (1956).